US008872926B2

(12) United States Patent
Jelinek et al.

(10) Patent No.: US 8,872,926 B2
(45) Date of Patent: Oct. 28, 2014

(54) FLASHLESS MOTION INVARIANT IMAGE ACQUISITION SYSTEM

(75) Inventors: Jan Jelinek, Plymouth, MN (US); Sharath Venkatesha, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 492 days.

(21) Appl. No.: 13/039,932

(22) Filed: Mar. 3, 2011

(65) Prior Publication Data

US 2012/0224088 A1    Sep. 6, 2012

(51) Int. Cl.
*H04N 5/228*    (2006.01)
*H04N 5/232*    (2006.01)

(52) U.S. Cl.
CPC ....... *H04N 5/23258* (2013.01); *H04N 5/23261* (2013.01); *H04N 5/2328* (2013.01)
USPC ..................................... 348/208.14; 348/262

(58) Field of Classification Search
CPC .............. H04N 5/232; H04N 5/23248; H04N 5/23254; H04N 55/23258
USPC ......... 348/169, 170, 171, 172, 208.1, 208.11, 348/208.12, 208.14, 208.2, 208.4, 208.6, 348/208.7, 208.99, 262, 335, 343, 350, 369, 348/208.5, 344
See application file for complete search history.

(56) References Cited

U.S. PATENT DOCUMENTS

| 3,833,762 | A | 9/1974 | Gudmundsen |
| 4,382,267 | A | 5/1983 | Angle |
| 5,331,365 | A * | 7/1994 | Miyazawa et al. ............... 396/51 |
| 5,859,892 | A | 1/1999 | Dillen |
| 6,781,094 | B2 * | 8/2004 | Harper ..................... 219/121.72 |
| 7,817,187 | B2 * | 10/2010 | Silsby et al. ............. 348/208.99 |
| 8,064,647 | B2 * | 11/2011 | Bazakos et al. ............... 382/117 |
| 8,576,324 | B2 | 11/2013 | Jelinek |
| 2001/0016053 | A1 | 8/2001 | Dickson et al. |
| 2002/0015094 | A1 * | 2/2002 | Kuwano et al. ............... 348/143 |

(Continued)

FOREIGN PATENT DOCUMENTS

| JP | 4-339476 A | | 11/1992 |
| JP | 2010-193324 | * | 9/2010 |
| JP | 2010-193324 A | | 9/2010 |

OTHER PUBLICATIONS

"Iris Image Interchange Format", ANSI standard INCITS m1/03-0590, American National Standard for Information Technology, (No date listed).

(Continued)

*Primary Examiner* — Lin Ye
*Assistant Examiner* — Chriss Yoder, III
(74) *Attorney, Agent, or Firm* — Schwegman Lundberg & Woessner, P.A.

(57) ABSTRACT

A flashless image acquisition system that includes a tandem imaging device having a tandem field of view and comprising a velocity vector estimate imaging device coupled to an object imaging device; and a peripheral imaging device having a peripheral field of view wider than the tandem field of view and configured to acquire real-time information related to positions of a moving object, wherein the real-time information is provided to the tandem imaging device, further wherein the velocity vector estimate imaging device is configured to provide in-exposure velocity vector estimates to control the object imaging device is described.

16 Claims, 8 Drawing Sheets

(56) References Cited

U.S. PATENT DOCUMENTS

2008/0129825 A1* 6/2008 DeAngelis et al. ........... 348/169
2009/0002501 A1 1/2009 Silsby et al.
2011/0169960 A1* 7/2011 Wagner ......................... 348/162
2011/0187880 A1 8/2011 Jelinek

OTHER PUBLICATIONS

"NoblePeak Technology—TriWave", http://www.noblepeak.com/Technology.html, Found at: http://web.archive.org/web/20080518175441/http://www.noblepeak.com/Technology.html, (Archived copy from May 18, 2008).

"What is Optical Image Stabilizer?", http://www.canon.com/bctv/faq/optis.html, Canon, Inc., (2009).

Agrawal, A., et al., "Resolving Objects at Higher Resolution from a Single Motion-blurred Image", IEEE Conference on Computer Vision and Pattern Recognition, 2007. CVPR '07., (2007), 1-8.

Platt, B. C, et al., "History and Principles of Shack-Hartmann Wavefront Sensing", Journal of Refractive Surgery, 17, (Sep./Oct. 2001), S573-S577.

Raskar, R., et al., "Coded exposure photography: motion deblurring using fluttered shutter", International Conference on Computer Graphics and Interactive Techniques, ACM SIGGRAPH 2006 Papers, (2006), 795-804.

Tonry, John L, et al., "The Orthogonal Transfer CCD", http://xxx.lanl.gov/abs/astro-ph/9705165, (May 21, 1997), 21 pgs.

Tonry, John L., et al., "The Orthogonal Transfer CCD", Experimental Astronomy, 8(1), (Mar. 1998), 77-87.

U.S. Appl. No. 12/699,368, Non Final Office Action mailed Mar. 27, 2013, 16 pgs.

U.S. Appl. No. 12/699,368, Preliminary Amendment filed Mar. 26, 2012, 3 pgs.

Great Britain Application Serial No. GB1101401.6, Search Report dated May 26, 2011, 4 pgs.

U.S. Appl. No. 12/699,368, Response filed May 23, 2013 to Non Final Office Action mailed Mar. 27, 2013, 8 pgs.

U.S. Appl. No. 12/699,368, Examiner Interview Summary mailed May 20, 2013, 3 pgs.

U.S. Appl. No. 12/699,368, Notice of Allowance mailed Jun. 13, 2013, 11 pgs.

Chinese Application No. 201110457634.6, Office Action mailed Dec. 26, 2013, (w/ English Translation), 29 pgs.

\* cited by examiner

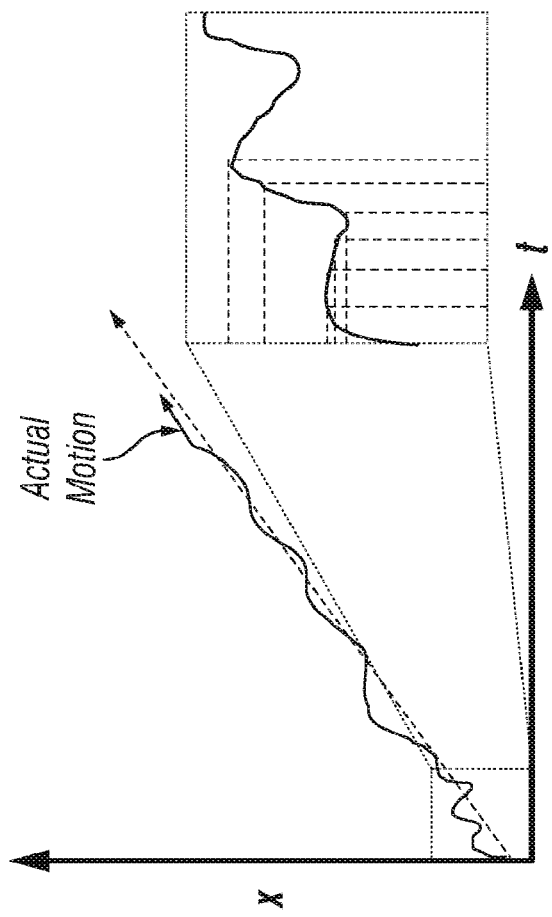
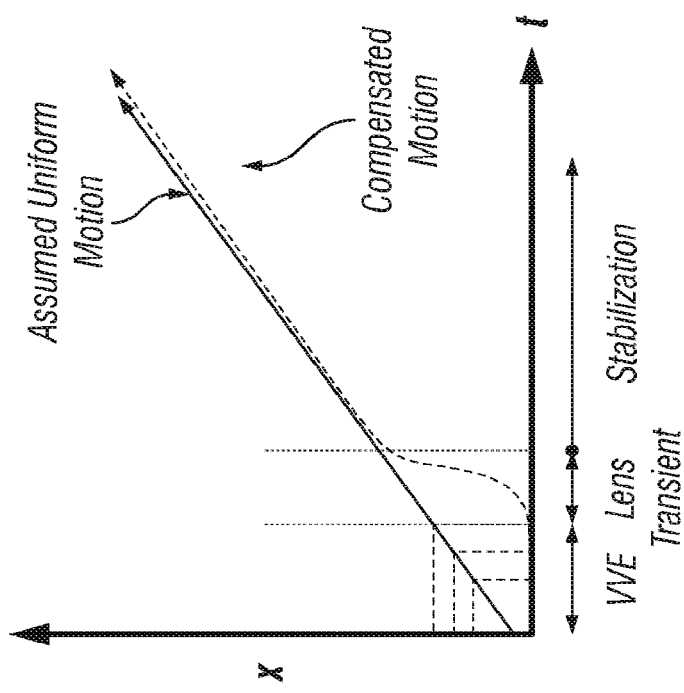
FIG. 4B
FIG. 4A

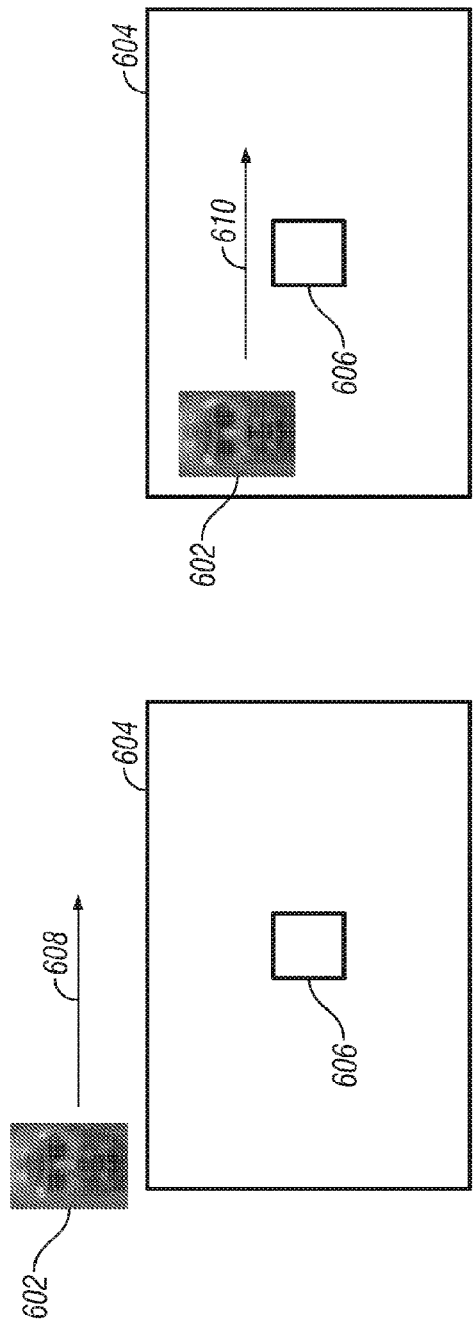
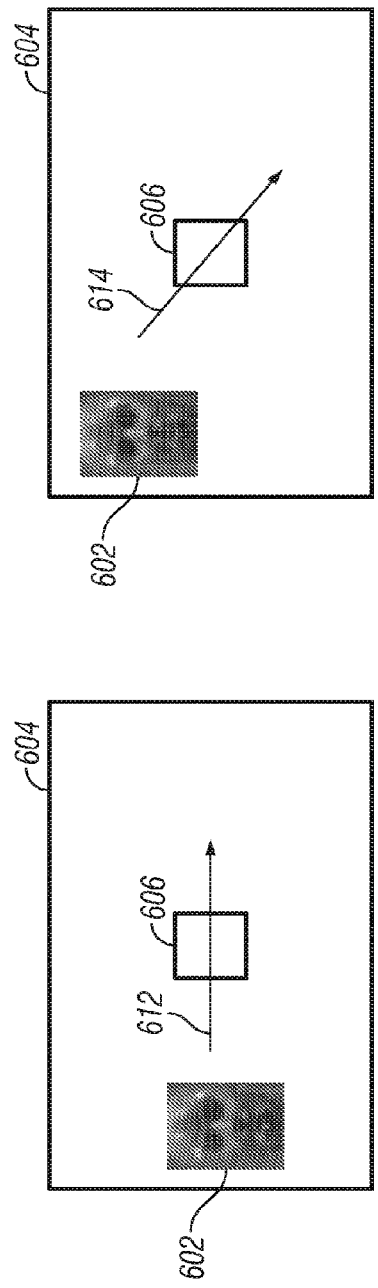
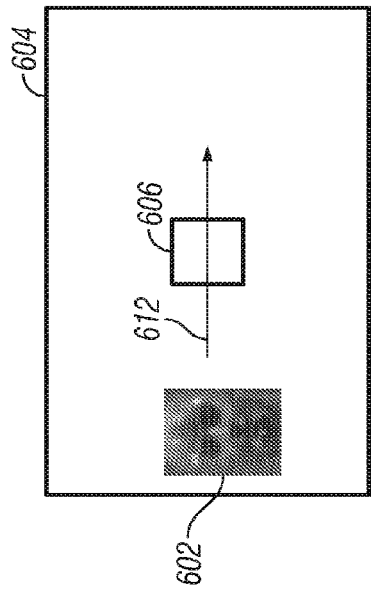

FLASHLESS MOTION INVARIANT IMAGE ACQUISITION SYSTEM

GOVERNMENT FUNDING

This invention was made with Government support under Contract Number W911NF-10-C-0022 awarded by IARPA. The United States Government has certain rights in the invention.

BACKGROUND

A conventional approach to acquiring high quality iris or face images of moving subjects is to freeze the subject motion by using extremely short exposures. The subject must be brightly illuminated by a flash in order to get a well exposed image. This approach commonly breaks down for larger distances because the flash power that is required in order to obtain an acceptable image often becomes eye unsafe.

Producing a well exposed image of a moving subject without flash illumination typically requires extending the image exposure. One drawback with this approach is that extending the image exposure introduces motion blur unless the relative motion between the subject and the camera sensor is eliminated.

The motion of a subject relative to the camera sensor can be real, apparent or both. Real motion is the result of the physical motion of the subject and/or the sensor. Real motion is described by a velocity vector, v(t), which gets decomposed into two components. The axial velocity vector points toward the sensor and is aligned with the optical axis of the sensor. The lateral velocity vector is the velocity vector projection into an X-Y plane perpendicular to the optical axis. Axial velocity affects the focusing of camera optics and may introduce magnification blur for long exposures. Lateral velocity causes motion blur.

Existing systems attempt to estimate the velocity vectors and then move items within the camera in order to compensate for axial and lateral motion of the subject relative to the camera. Moveable lenses are widely used as image stabilizing elements in cameras to counter camera shake during exposure. One known approach is to use a pair of inertial sensors to detect camera motion between and then move the stabilization lens to compensate. An alternative approach employs a tip-tilt mirror to compensate for the relative motion.

While the above described solutions can counter motion originating at the camera, they can neither stabilize the projection of a moving object, even if the camera is rock steady, nor can they handle the effects of the atmospheric optical instability. Some components of the shimmer manifest themselves as apparent motion, even if both the object and camera are perfectly stationary.

Another drawback with these types of solutions is that they typically cannot track very fast motions. In addition, these approaches usually utilize delicate mechanical parts that make their use problematic in military and security applications.

BRIEF DESCRIPTION OF THE DRAWINGS

FIG. 4A illustrates a sampling rate of a VVE imaging device for uniform motion according to an example embodiment.

FIG. 4B illustrates a sampling rate of a VVE imaging device for actual motion according to an example embodiment.

FIGS. 6A-6D show example motion patterns of a moving object through a tandem imaging device's field of view (FOV) according to example embodiments.

DETAILED DESCRIPTION

Figure 1:
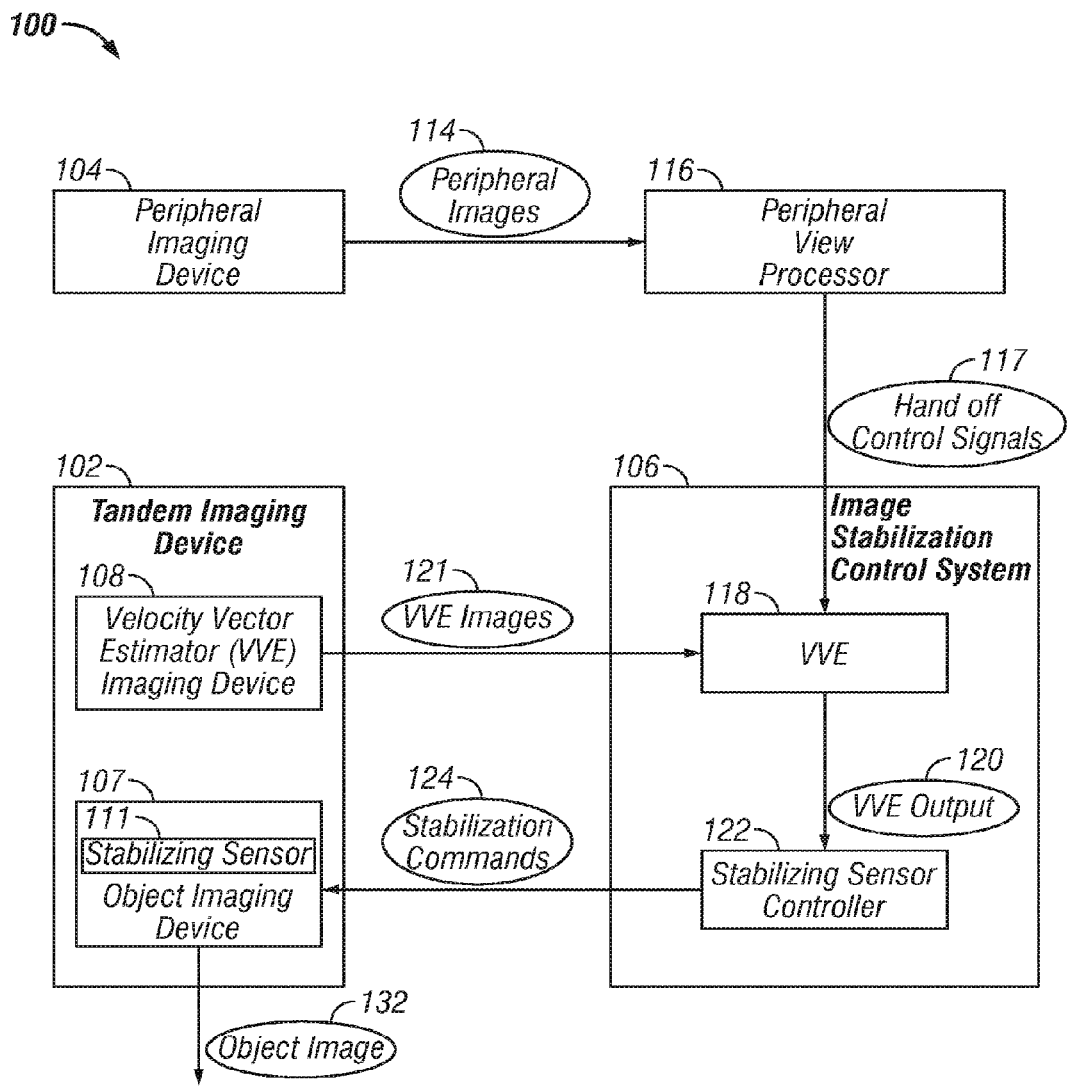
FIG. 1 is a simplified schematic illustration showing operation of a flashless motion invariant image acquisition system (hereinafter "image acquisition system") according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating directly on an imaging system, such as a camera or on a computer system, such as a personal computer, server or other computer system.

Objects in motion are difficult to image, particularly in flashless systems. Without a flash to freeze the object motion during exposure, an image projection stabilizing element to stabilize a moving object projection onto the camera sensor during a long exposure can be inserted into the optical path and its behavior properly controlled to counter the relative motion. A number of high-end photographic cameras offer the image stabilization feature. However, their motion sensors can detect only the camera body motion. Such sensors are "blind" when it comes to the object or apparent motion. To perceive it, the main object acquisition camera can be coupled with a second camera which feeds a velocity vector estimator, whose output drives the image projection stabilizing element. See, for example U.S. patent application Ser. No. 12/699,368, which is incorporated herein by reference in its entirety. This type of system relies on a pre-exposure velocity vector estimate and operates in two steps. First, the velocity vector of the moving object relative to the camera is measured. Once that measurement is determined, it is passed to the stabilizing lens control system, which initiates a counter-movement. Once the stabilizing lens control system accelerates the lens to the desired velocity, the camera shutter is open and the image begins its exposure while the stabilizing lens keeps moving at the desired velocity. However, since the velocity vector is not updated after it is passed to the controller, use of pre-exposure velocity vector estimation cannot address scenarios in which the object velocity does not stay constant, but is changing during exposure.

In contrast, embodiments described herein do not compute a velocity vector beforehand, before the object image exposure is initiated. As such, various embodiments provide an in-exposure velocity vector estimation using a velocity vector estimator (VVE) to provide information to a stabilizing sensor in real time (e.g., 111 in FIG. 1) to drive the stabilizing sensor. In this way, the relative velocity of an object, be it due to real physical motion of the object or apparent motion resulting from the optical instability of the atmosphere, or both, is continuously measured in the course of an object image exposure. In order to achieve adequate projection motion compensation, the stabilizing sensor (e.g., 111 in FIG. 1) is a configured to be a dynamically responsive image stabilizer capable of being driven to counter rapidly changing movements like those arising from apparent motion. The stabilizing sensor is located within a tandem imaging device, which is coupled with a peripheral imaging device (FIG. 1).

Object images are often desired to have a high image resolution. For example, images of eye irises used in biometric applications utilize a resolution of about 10 to about 15 pixels per mm in the object plane. At such resolutions, even sensors with image sizes as large as about 10 megapixels, offer only a myopic field of view of the scene, on the order of only about 10×10 to about 30×30 cm. When an object to be imaged is moving, such a myopic object imaging device is prepared in advance for its capture before it arrives into its field of view. In one embodiment, this assistance is provided by a peripheral image processor which processes peripheral images obtained by the peripheral imaging device. In various embodiments, the device is configured to have a larger field of view. Its size choice depends mainly on the maximum velocity of the object motion. In the above example of iris imaging, the peripheral field of view is about 200×200 cm and, consequently, the peripheral imaging device is configured to have a lower resolution than the object imaging device as well as a faster frame rate than the object imaging device. In one embodiment, the frame rate of the peripheral imaging device is sufficient to enable coarse object velocity vector estimation. In the same example, the peripheral imaging device has a resolution of about 0.5 pixels per mm in the object plane.

As the object of interest enters the peripheral device's field of view, it is first detected and than its motion tracked from one image to the next. Once the object enters the small field of view of the object imaging device, the tracking responsibility is handed over to another velocity vector estimator (VVE), whose own velocity vector estimator imaging device shares the main optics with the object imaging device. The optically-coupled tandem imaging device has its own main optics, in order to give both devices substantially the same field of view. In one embodiment, the VVE imaging device has substantially the same resolution as the object imaging device. In order to accomplish an accurate correlation based tracking, in one embodiment, the window to track from frame to frame has a spatial frequency content commensurable with the smallest details the user wants to preserve in the object image. What is considered a "high" spatial frequency is dependent on a particular application as is understood in the art. This information cannot come from the peripheral image obtained by the peripheral imaging device, because no such high frequencies (e.g., those discernible at about 10 to about 15 pixels/mm) are seen in it due to its low resolution (e.g., as low as about 0.5 pixel/mm). On the other hand, due to its pre-cognitive mode of operation, the VVE is also not used to look for a "meaning" in an image, such as an eye corner. As such, in one embodiment, average pixel intensity variance is computed over a few windows of the desired size randomly placed in the vicinity of the expected eye center location within the region of interest (ROI) and then picking the one offering the maximum intensity variance. The variance is a rough measure of image contrast within the window and thus of spatial frequency bandwidth. In the iris application, a window which can be selected by this "blind" procedure, in some embodiments, often centers at an eye corner because of its sharp and contrast components (See, for example, FIG. 8).

In one embodiment, the peripheral imaging device detects an object moving toward the tandem imaging device, and, using a short sequence of images taken in rapid succession determines if, where and when the object of interest will enter the tandem imaging device's field of view (FOV). (See, for example, FIGS. 6A-6D). This real-time information is communicated or "handed off" to the tandem imaging device. As such, the real-time information is conveyed as coordinates of a point the peripheral imaging device interprets to be the object center (e.g., eye center) in a particular frame yet to come. Such "early warning" gives the VVE sufficient information as to where to place a region of interest (ROI) containing the object's center in its FOV and which frame in its stream of images to pick out. The VVE then locks onto the point, and its vicinity, and tracks this area within VVE images across its FOV, while continuously re-computing the velocity vector estimation using the VVE image data. As such, the VVE provides information to a stabilizing sensor (e.g., 111 in FIG. 1) to drive the stabilizing sensor, i.e., the actuator of a feedback control loop which enables tracking of the moving object. In this way, in-exposure velocity vector estimation is achieved.

Since the tandem imaging device does not interpret the VVE images and thus is not "aware" of what it is viewing, there is a timed "handoff" to it from the peripheral imaging device. As part of the "handoff", a pixel-based registration of the moving object occurs in the peripheral imaging device. The registration may not be precise due to the mismatch between the resolutions in the peripheral and VVE images, but an approximate location of where the VVE can find the moving object in its own images provided by the peripheral imaging device is generally sufficient.

FIG. 1 shows one embodiment of a simplified schematic illustration of an example flashless motion invariant imaging acquisition system (hereinafter "system") 100 for acquiring motion invariant images. The system 100 comprises a tandem imaging device 102 in communication with a peripheral imaging device 104 via an image stabilization control system 106. The tandem imaging device 102 comprises an object imaging device 107 coupled to a velocity vector estimation (VVE) imaging device 108. In one embodiment, the object imaging device 107 and the VVE imaging device 108 are mechanically coupled together, and are optically registered through optics hardware, such as a Single Lens Splitter (SLS) optics design (not shown).

In the embodiment shown in FIG. 1, the object imaging device 107 includes a stabilizing sensor 111, such as a device assembled from multiple components, such as a charge coupled device (CCD), (e.g., an orthogonal transfer (OT) CCD sensor), or a chip, such as a complementary metal oxide (CMOS) semiconductor (CMOS) chip. In one embodiment, the VVE imaging device 108 includes an electron multiplying (EM) CCD sensor. In one embodiment, the stabilizing sensor 111 uses a moveable element or one or more micro electrical mechanical system (MEMS) mirrors in its optical path.

Any suitable type of electronics can be used to interface the image stabilization control system 106 with the peripheral imaging device 104 and with the tandem imaging device 102, as is known in the art.

In the embodiment shown in FIG. 1, the image stabilization control system 106 includes a velocity vector estimator (VVE) 118 and a stabilizing sensor controller 122. The VVE 118 receives VVE images 121 from its own dedicated VVE imaging device 108. In one embodiment, the VVE imaging device delivers about 180 frames per second, each taken using about 1 ms exposure. Such values are application dependent, and can vary significantly depending on a given set of conditions.

In one embodiment, the stabilizing chip 111 is a dynamically responsive image stabilizer which is capable of being driven to counter "fast" changing trajectories arising from apparent motion that change with the average frequency of about 30 Hz. In one embodiment, an OT-CCD sensor having an array of pixels which can be moved about its silicon substrate is used. In this embodiment, only the pixels' potential wells are moved, not the pixels' physical structures implanted on the silicon. Lacking any inertia, the wells can, in one embodiment, be moved extremely fast, such as about 150,000 shifts per second. In one embodiment, the moves are elementary moves, such as into adjacent locations. As such, the various embodiments described herein have the potential to compensate for subject motion at velocities greatly exceeding 1.5 meters/second (m/s). Having no moving parts, embodiments of the systems described herein can offer extreme ruggedness and reliability as well as low manufacturing costs.

In operation, the VVE 118 calculates a new velocity vector estimate upon receiving a new image from the VVE imaging device 108. In the embodiment shown in FIG. 1, the peripheral imaging device 104 provides peripheral images 124 to a peripheral view processor 116 which, in turn, provides handoff control signals 117 to the VVE 118. In one embodiment, the VVE 118 can be pre-programmed to use a certain "window" size, but in various embodiments relies on real-time information from the peripheral view processor 116 to determine which window size to use and where to place it within the VVE image 121 at the handoff instant.

The VVE 118 provides VVE output 120 to a stabilizing sensor controller 122, which, in turn, provides stabilization commands 124 to the stabilizing sensor 111 in the object imaging device 107. By maintaining communication with the image stabilization control system 106, the object imaging device 107 receives dynamic feedback on in which direction and by how much to move its stabilizing sensor during image acquisition. Utilizing information on the VVE output 120, the object imaging device 107 produces an object image 132, i.e., a motion invariant image of a moving object.

As such, the VVE 118, together with the VVE imaging device 108 constitute a "relative motion sensor" for the system 100, whereas the stabilizing sensor 111 acts as an actuator of a feedback control loop in the system 100, which enables tracking of the moving object. In one embodiment, the object imaging device 107 can support updates coming from the VVE output 120 at the rate of about one (1) kHz, i.e., up to about 1000 updates/second. In one embodiment, communication between the image stabilization control system 106 and the object imaging device 107 includes use of a low voltage differential signaling (LVDS) device, which can run at high speeds over twisted pairs. In one embodiment, signal integrity can be maintained through use of the LVDS device. In one embodiment, the interface between the object imaging device 107 and the image stabilization control system 106 supports both absolute and relative pixel shift specifications. In one embodiment, the interface enables control of the imaging devices from up to a distance of about 4.6 meters (m).

Information between the subsystems 107 and 108 can be exchanged via a direct interface. In one embodiment, end-to-end latency, i.e., time from a first VVE frame capture by the VVE imaging device 108 to the stabilizing sensor 111 within the objective imaging device 107 is less than about one (1) millisecond (ms).

In one embodiment, the VVE 118 utilizes a graphics processing unit (GPU) to process VVE images 121 from the VVE imaging device 108. In one embodiment, the GPU is in wired or wireless communication with any type of server or computer system (not shown). In one embodiment, the GPU communicates with such an external system using any suitable type of computer expansion card standard, such as a Peripheral Component Interconnect (PCI), PCI-eXtended (PCI-X) or Accelerated Graphics Port (AGP). In one embodiment, the GPU and external system communicate using PIE Express (PCIe) with the object imaging device 107 communicating with the GPU using a serial peripheral interface (SPI) bus.

In one embodiment, the FOV and pixel density are the same for the VVE and object imaging devices (e.g., 107 and 108, respectively). In one embodiment, an EM CCD camera can be used as the VVE imaging device (e.g., 108). In one embodiment, an OT CCD camera can be used as the object imaging device 107 with its OT sensor acting as the stabilizing element 111. In other embodiments, other image projection stabilizing elements can be used providing that they are sufficiently dynamically responsive for a given application.

With the imaging system described herein, a scene can be monitored and a face detected when it moves in, allowing one eye of the face to be locked onto. Thereafter, from a short sequence of peripheral imaging device images 114, the peripheral image processor 116 can determine the eye's entry point and approximate time of entry into the tandem imaging device's FOV, thus pre-activating the tandem imaging device 102 for action as soon as the eye enters its FOV.

Figure 2:
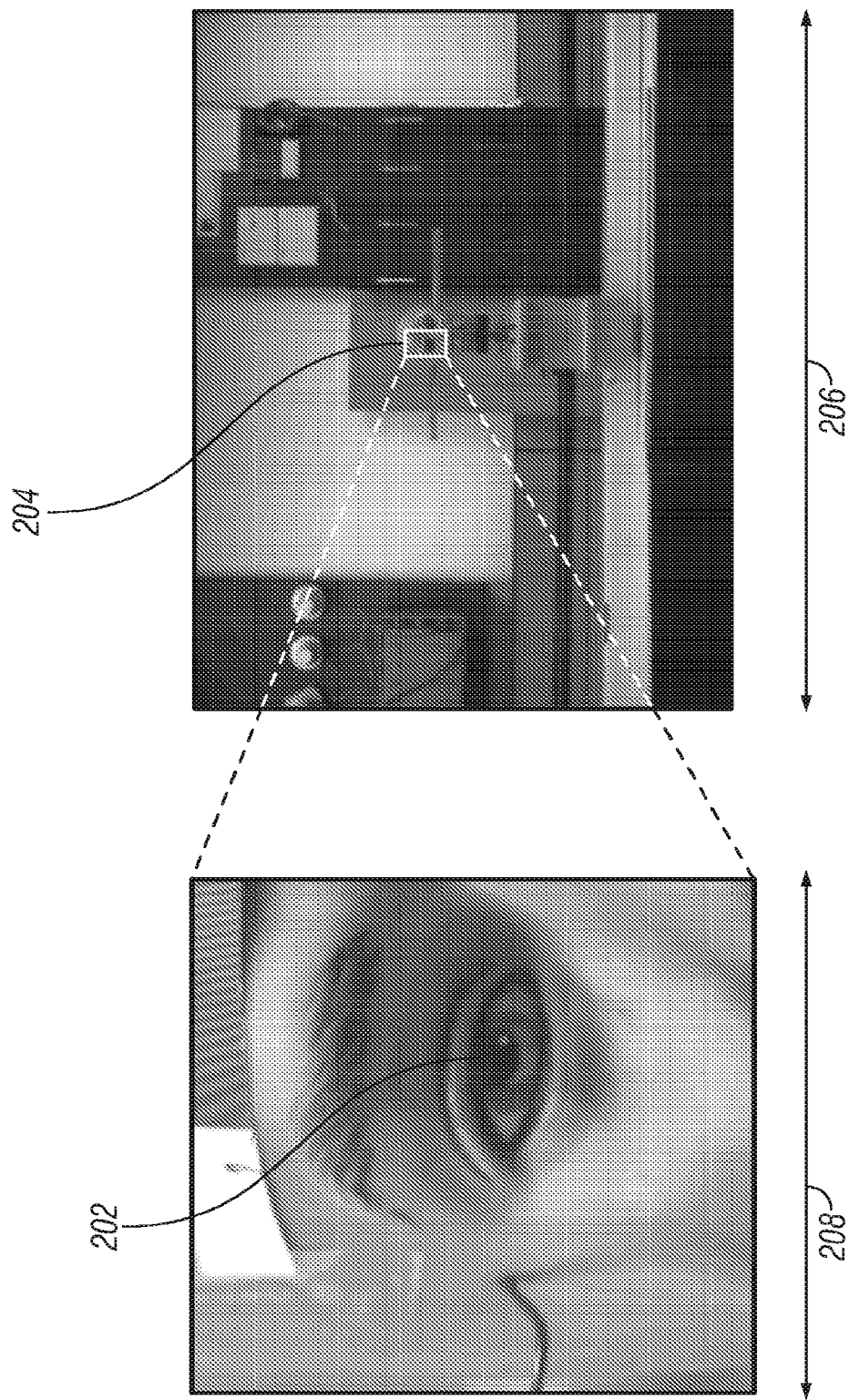
FIG. 2A is an image acquired with a tandem imaging device comprising a velocity vector estimator (VVE) imaging device and an object imaging device according to an example embodiment.
FIG. 2B is an image acquired with a peripheral imaging device in communication with the tandem imaging device of FIG. 2A according to an example embodiment.

FIG. 2A shows an example object image of an eye 202 acquired using information about the location of the eye 202 provided by a VVE imaging device which monitored and captured a series of VVE images of a moving face 204 containing the eye 202. The results shown in FIGS. 2A and 2B were obtained using an imaging system comprising a Pixelink B-741 camera ("Pixelink") as the peripheral imaging device and a Hamamatsu C 9100 camera ("Hamamatsu") as the VVE imaging device. (Because the readout times for the Hamamatsu camera depend primarily on the number of rows, not columns, it was programmed to capture a region of interest (ROI) spanning the entire FOV width. While its height is also fixed by design, its vertical placement was given by the expected eye center location information from the peripheral subsystem).

With this example imaging system, the peripheral imaging device (Pixelink) had a 1280×1024 pixel array and tracked the face 204 over its FOV width 206 of about 2000 mm. Its exposure time was about 8 ms. The VVE imaging device (Hamamatsu) had a 1000×1000 pixel array and was able to capture the eye 202 within its FOV width 208 of about 75 mm.

The object imaging device had a one (1) megapixel array providing a FOV of about 75×75 mm at a resolution of about 12 pixels/mm. (As such, if the head 204 moved at about one (1) m/s, it would take it only about 75 ms to enter and exit the tandem imaging system's FOV). Face and eye detection in the peripheral image processor was achieved in about six (6) ms. The VVE imaging device image frame rate was about 6.5 ms with an approximately one (1) ms exposure.

Figure 3:
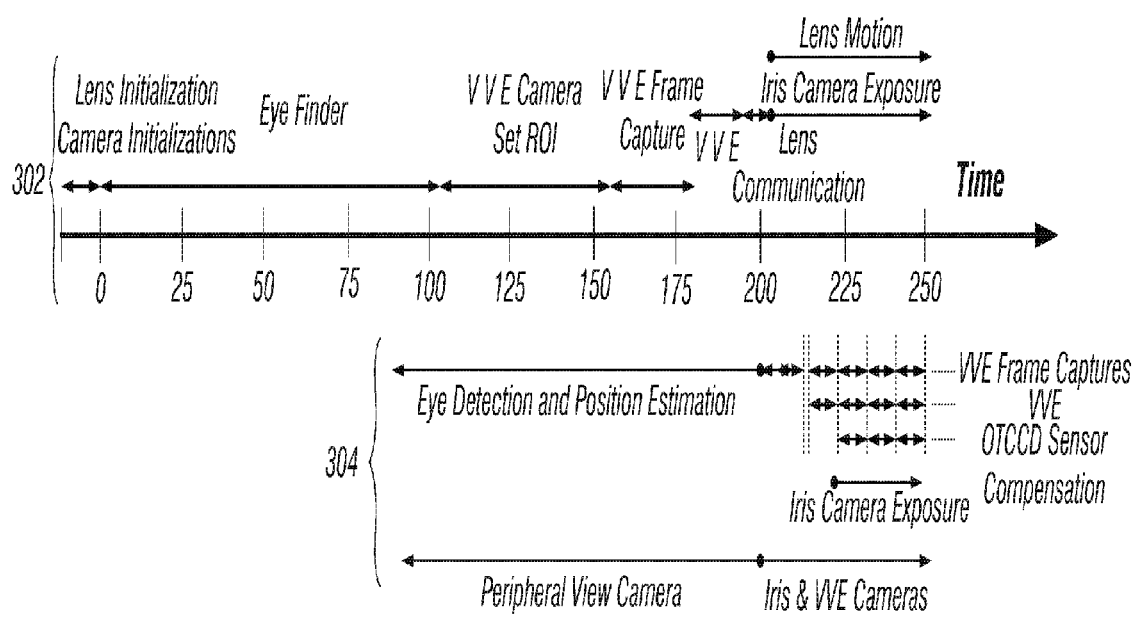
FIG. 3 illustrates a timeline for acquiring a motion invariant image of a moving object using an image acquisition system as compared with a prior art timeline according to an example embodiment.

FIG. 3 shows a prior art timeline 302 (for comparison) and an example timeline 304 using the system described above in FIGS. 2A and 2B. As timeline 302 shows, the prior art process includes a "pre-exposure" velocity vector estimation step. In timeline 302, each task is executed sequentially, with all tasks relying on images from the same imaging device. Thus, in the prior art process one imaging device plays a dual role, serving at times as both the peripheral view and VVE imaging devices. The first step in the prior art process includes finding an eye in a first image and centering a small region of interest within it. The changing location of the eye is then tracked in a VVE imaging device sequence of successive frames using a correlation method, which minimizes the least means square difference between image intensity profile in a small window (referred to as "template") selected within the region of interest around the eye as it was located in the first image and that in a search window of the same size in each of the subsequent VVE images. In the prior art timeline 302 shown in FIG. 3, after processing a few frames, the velocity vector estimator (VVE) has enough data to calculate the velocity vector estimate and pass it to a stabilizing lens controller, which starts moving the lens. Once its velocity reaches the desired value after a brief transient, the controller issues a pulse to the object camera, commanding it to open its shutter and begin exposing the image. While the lens is moving at the desired speed and the object image is being exposed, there is no feedback on the actual motion even though the velocity vector camera continues to provide fast frames and the GPU is processing them in real time. Since the object imaging device in the prior art has a large FOV, there is no need for a peripheral view in it and thus it does not appear in the prior art timeline 302.

Referring also to FIG. 1, in contrast, the example timeline 304 corresponds to the system 100, in which the roles of the various devices are separated. The system includes an "in-exposure" velocity vector estimator 118 which utilizes a tandem imaging device 102 which provides a myopic view of the scene. As such, the tandem imaging device relies on external assistance from the peripheral imaging device 104 to supplement its spatially limited sensing capability. In contrast to the prior art method shown in timeline 302, the eye tracking step referred to in timeline 304 as Position Determination (i.e., Point of Entry Determination or Entry Determination) does not support an image stabilizer during the iris image exposure. Instead, the eye tracking step in timeline 304 is delegated to the peripheral view processor 116 and is used to determine if, where and when an object, such as an eye, is going to enter the FOV of the tandem imaging device 102. Once it becomes available, this information 117 is handed off to the Image Stabilization Control System 106. In one embodiment, the VVE uses the correlation method described above to track the object's motion across the tandem imaging device's FOV. In contrast to the prior art, however, real-time feedback tracking control is being provided, i.e., in-exposure vs pre-exposure information which relies on a high frame rate as discussed above (e.g., as high as about 1000 frames per second).

In the various embodiments, the two subsystems (tandem and peripheral imaging devices) of the flashless motion invariant image acquisition system 100 "see" different things in the scene and cannot localize them with the same level of precision. In one embodiment, the peripheral imaging device 104 has a wider FOV as compared to the object imaging device 102 and captures a smaller image size due to real time processing constraints. The "zoom factor", i.e., the ratio of the peripheral and tandem (or "foveal") FOV dimensions, is primarily determined by the object velocity as well as engineering limitations as the time needed to detect an object entering the peripheral FOV and estimate with sufficient accuracy when and where it is going to enter the tandem FOV. In one embodiment, the "zoom factor", i.e., the scene viewed by the peripheral imaging device 104 is about 25-times wider. It should be noted, however, that unless objects are known to be closing in from a particular direction, the fields of view for the peripheral and tandem imaging devices are approximately concentric.

While the limited resolution of peripheral images is sufficient for the face detection and eye finding chores, it would be too low for estimating the velocity vector with accuracy sufficient to obtain the desired object images, such as iris images. This is the reason why tracking a moving object during exposure, when accurate tracking is required, uses images from the dedicated VVE imaging device, which have much higher resolution and are acquired at higher frame rates. In one embodiment, the ratio of image sizes between VVE images 121 and object images 132 is approximately 1:1, i.e., the VVE imaging device 108 and object imaging device 107 in the tandem imaging device 102, e.g., an SLS tandem imaging device, are configured to provide substantially identical image sizes. As a general rule, in order to make good use of the object imaging device resolution, the VVE images should have at least the same resolution, but sensor technology constraints may make this ideal unattainable for sensors with array sizes larger than about 1 to 2 megapixels due to their inherently lower frame rates.

FIGS. 4A and B show how the distance of a moving object projected on the x-axis of the image increases as a function of time for linear motion at a constant velocity and general motion, when the object accelerates and decelerates at random. FIG. 4A plots the increase for uniform motion. Compared to a sampling rate needed for general motion shown in FIG. 4B, the sampling for uniform motion shown in FIG. 4A can be performed at a lower frequency, whose actual value is dictated by the desired accuracy of tracking. For general motion, the rate cannot be specified unless we know the kind of randomness involved.

Figure 5A:
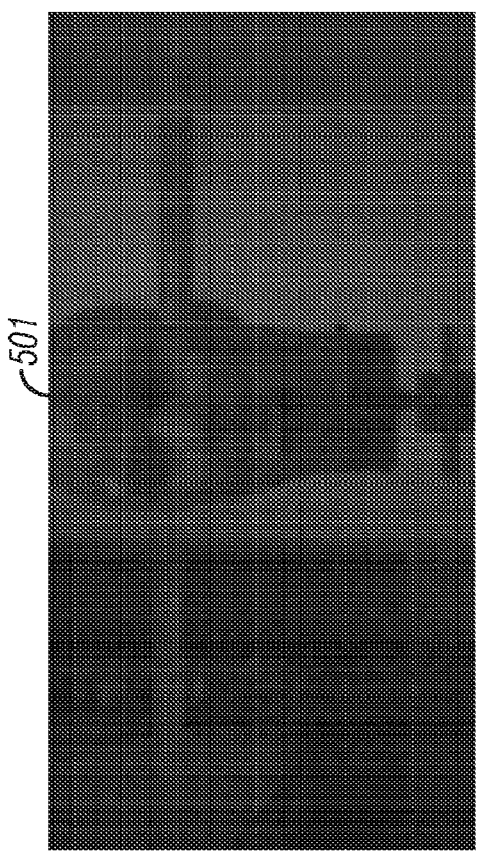
FIGS. 5A and 5B show face detection on an image captured at an exposure of three (3) milliseconds (ms) according to example embodiments.
Figure 5B:
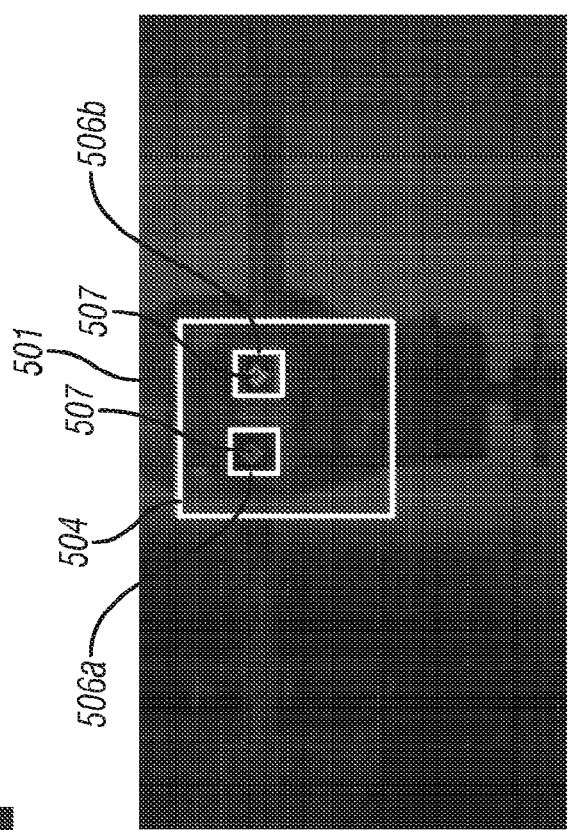

FIGS. 5A and 5B show low exposure images of a mannequin head 501 having a face size of about 50×50 pixels, with the face detected inside the window 504 and eye localization 506a and 506b shown in FIG. 5B. In one embodiment, the face size is no less than about 24×24 pixels. In one embodiment, the face detection and eye localization algorithms take about 6.5 ms to execute, which is less than the peripheral camera frame rate of 8 ms, making it possible to run the code in real time, concurrently with peripheral image acquisition.

As noted herein, in order to obtain an appropriate handoff between the peripheral imaging device and tandem imaging device, tracking of a moving object, such as an eye, is employed. In one embodiment, the object position is tracked based on continuity of motion. In one embodiment, the peripheral imaging system estimates the direction of the object once it appears in its FOV and selects the appropriate region of interest (ROI) for acquisition. See, for example, FIGS. 6A-6D which shows movement of a face 602 in relation to a peripheral imaging device's FOV (hereinafter "peripheral FOV") 604 and a tandem imaging device's FOV (hereinafter "tandem FOV") 606. In the embodiment shown in FIG. 6A, the face 602 moves in a left to right pattern 608 not only outside the tandem FOV 606, but also outside the peripheral FOV 604. Such a movement would not allow a detection of the face. In the embodiment shown in FIG. 6B, the face 602 moves in a left to right pattern (on the paper) 610 within the peripheral FOV 604, but still outside of the tandem FOV 606. While such a movement would allow a determination of movement, in this example, the eye will never cross the tandem FOV and thus could not be captured. In the embodiment shown in FIG. 6C, the face 602 moves in a left to right pattern 612 not only within the peripheral FOV 604, but also within the tandem FOV 606. Such a movement allows a tandem imaging system (such as shown in FIG. 1) to properly image the eye onto which it was alerted and guided through the handoff information provided by the peripheral system. Similarly, FIG. 6D, shows the face 604 moving in a diagonally downward pattern (on the paper) 614 within both the peripheral FOV 604 and the tandem FOV 606, thus allowing the tandem imaging system to properly image the eye. As can be seen, the direction of travel, which can include up to down (top to bottom on the paper), right to left, diagonally upward in any direction, does not affect the desired outcome. Rather, it is the location within the fields of view that determine whether or not an eye can be imaged.

Figure 7:
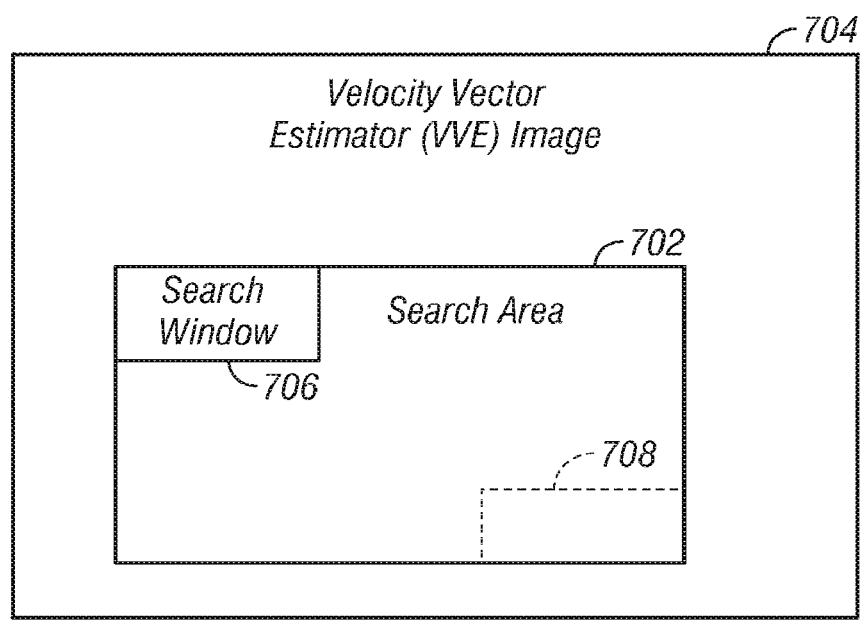
FIG. 7 shows an example search template selection according to an example embodiment.

FIG. 7 shows how an exemplary search for an eye within the VVE image is constrained in order to lower the computational costs. In this embodiment a search area 702 is located within a VVE image 704 as it comes from the VVE imaging device. The search window 706 is a small window of the same dimensions as the eye template to which it is being matched using the correlation method. The size of the template depends on the type and amount of noise present in the VVE images. Larger templates are more immune to noise, but utilize more computation. In the course of finding the best match, the search window is gradually moved around the search area 702 whose size may be constrained by the expected maximum velocity of the moving object and computational complexity.

In one embodiment, the eye template is a small window selected from within an area in the first VVE image taken after handoff. The area location and size are the subject of the handoff information. The eye template is selected from a small number of windows the size of the eye template on the basis of maximum intensity variance to ensure that it contains high spatial frequency components that are utilized to obtain proper localization. The windows are randomly selected from within the area identified in the first VVE image after handoff.

Figure 8:
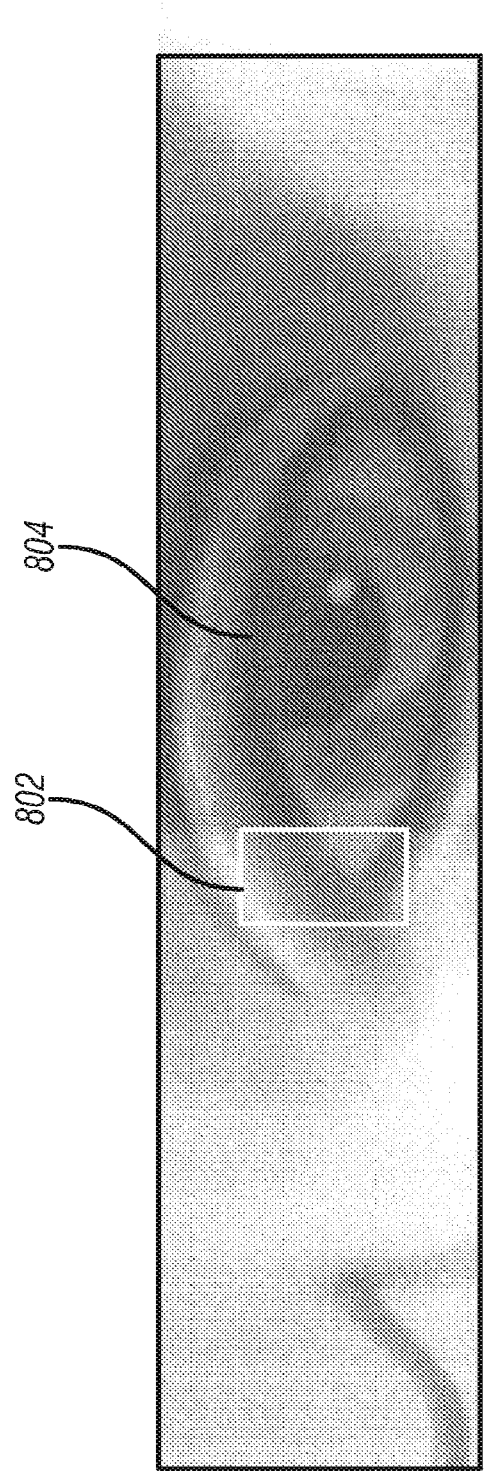
FIG. 8 shows an eye image captured at one (1) ms exposure and a gain of 200 according to an example embodiment.

In one embodiment, only a portion of an ocular area of an eye typically constitutes the area identified using the handoff information. FIG. 8 shows a region of interest (ROI) in a VVE image, in which an exemplary eye template 802 is shown. The eye template is tracked from frame to frame as a head is moving. The window 802 includes a corner of an eye image 804 which is within the ROI, but which has already moved farther away from the location where it was seen the first time after entering the tandem FOV. The image was captured and the ROI extracted in real time by a VVE imaging device having an EM CCD sensor, at one (1) ms exposure and a gain of 200. In the image shown in FIG. 8, the eye template 802 is substantially "perfectly" placed relative to the eye image 804. Because the eye template placement is based on random sampling, the eye itself may be only partly visible in the template 802 or even not be present in it at all. This can occur for a number of reasons, such as with a large difference between the resolution of each device and/or limited accuracy of time synchronization between the peripheral and tandem imaging device clocks. Such an off-placement need not necessarily preclude the correct tracking of the eye region and thus have negative impact on performance.

In one embodiment, the tandem imaging device has its own optics that ensures that the VVE and object images are accurately registered. The two imaging devices share the main objective, typically a zoom, followed by a beam splitter that separates the outgoing light into its visible (VIS) and near infrared (NIR) spectra. The former is deflected into the VVE imaging device, the latter goes into the object imaging device. Such optics design is called the Single Beam Splitter (SLS). Auxiliary optics inserted between the splitter and the VVE imaging device ensures that both imaging devices have substantially identical FOV's, and their pixels are in a well-defined and known spatial relationship (i.e., their images are accurately registered).

In contrast to conventional systems which require object capture (e.g., of an iris in an eye on a moving face) after the estimate is known, the imaging system described herein (e.g., 100 in FIG. 1) does not utilize face and eye finding followed by pre-exposure velocity vector estimation. Rather, the embodiments described herein utilize a VVE imaging device (e.g., 108) to provide in-exposure velocity vector estimation to an object imaging device (e.g., 107) which can then image a moving object, such as an iris of an eye.

As such, in various embodiments described herein, the imaging system can perform a series of functions which can include 1) face detection and eye localization, 2) handoff from the peripheral imaging device to the tandem imaging device, 3) sub-eye region tracking, 4) velocity vector estimation, 5) optionally, sensor compensation, such as an OT CCD sensor compensation, and 6) object capture, such as an iris capture. In one embodiment, invariance to apparent motion in long range systems, i.e., systems in which the moving object is at a distance exceeding about ten meters up to about 15 meters or 30 meters or more, allows acquisition of object imagery in optically unstable environments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A flashless image acquisition system comprising:
a tandem imaging device having a tandem field of view and comprising a velocity vector estimate imaging device coupled to an object imaging device; and
a peripheral imaging device having a peripheral field of view wider than the tandem field of view and configured to acquire real-time information related to positions of a moving object, wherein the real-time information is provided to the tandem imaging device, further wherein a velocity vector estimator located in the system is configured to provide in-exposure velocity vector estimates to control the object imaging device, and wherein a ratio of a dimension of the peripheral field of view and a dimension of the tandem field of view is determined as a function of an object velocity of the moving object.

2. The system of claim 1 wherein the system further comprises:
an imaging stabilizing control system which includes:
the velocity vector estimator in communication with the tandem imaging device and the peripheral imaging device; and
a stabilizing sensor controller configured to receive output from the velocity vector estimator.

3. The system of claim 2 wherein the velocity vector estimator is configured to receive velocity vector estimate images from the velocity vector estimate imaging device and the real-time information from the peripheral imaging device.

4. The system of claim 3 wherein the object imaging device is configured to acquire a motion invariant image of the moving object after receiving stabilization commands from the stabilizing sensor controller.

5. The system of claim 4 wherein the object imaging device comprises a stabilizing sensor and the in-exposure velocity vector estimation information is received by the stabilizing sensor.

6. The system of claim 5 wherein the moving object is an eye located on a face and the peripheral imaging device provides real-time information enabling face and eye detection.

7. The system of claim 1 wherein the peripheral imaging device, the VVE imaging device and object imaging device are cameras.

8. A method of acquiring a motion invariant image of a moving object comprising:
with a peripheral imaging device having a peripheral field of view, acquiring a peripheral image containing real-time information about the moving object;
relaying the real-time information to a tandem imaging device having a peripheral tandem field of view and in communication with the peripheral imaging device, wherein the tandem imaging device comprises a velocity vector estimation imaging device and an object imaging device;
with the velocity vector imaging device, acquiring a velocity vector estimate image;
providing the velocity vector estimate image to a velocity vector estimator; and
providing output from the velocity vector estimator to a stabilizing sensor in the object imaging device while the object imaging device is acquiring an image or images of the moving object,
wherein a ratio of a dimension of the peripheral field of view and a dimension of the tandem field of view is determined as a function of an object velocity of the moving object.

9. The method of claim 8 wherein the output from the velocity vector estimator is first provided to a stabilizing sensor controller which, in turn, provides stabilization commands to the stabilizing sensor repeatedly during the object image exposure.

10. The method of claim 8 wherein the tandem imaging device receives the real-time information from a series of images acquired by the peripheral imaging device prior to starting the recording of the object image.

11. A method comprising:
with a peripheral imaging device having a peripheral field of view,
detecting a moving face;
tracking a portion of an eye region on the moving face;
handing off eye region location information to a tandem imaging device; and
with the tandem imaging device having a tandem field of view,
localizing the portion of the eye region based on the eye region location information; and
acquiring a motion invariant image using in-exposure velocity vector estimation information,
wherein a ratio of a dimension of the peripheral field of view and a dimension of the tandem field of view is determined as a function of an object velocity of the moving face.

12. The method of claim 11 wherein the in-exposure velocity vector estimation information provides information to a stabilizing sensor in the tandem imaging device.

13. The method of claim 12 wherein the stabilizing sensor is an orthogonal transfer charge coupled device.

14. The method of claim 12 wherein the stabilizing sensor has an optical path and the stabilizing sensor uses a moveable element in the optical path.

15. The method of claim 12 wherein the stabilizing sensor has an optical path and the stabilizing sensor uses one or more micro electrical mechanical system (MEMS) mirrors in the optical path.

16. The method of claim 11 wherein the localizing step includes acquiring a series of velocity vector estimation images.

* * * * *